United States Patent
Lee

(10) Patent No.: US 7,792,508 B2
(45) Date of Patent: Sep. 7, 2010

(54) RADIO FREQUENCY SIGNAL RECEIVER FOR CONTROLLING BIAS CURRENT AND METHOD FOR CONTROLLING BIAS CURRENT

(75) Inventor: Jeong-ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 793 days.

(21) Appl. No.: 11/512,153

(22) Filed: Aug. 30, 2006

(65) Prior Publication Data
US 2007/0072572 A1    Mar. 29, 2007

(30) Foreign Application Priority Data
Sep. 26, 2005    (KR) ............... 10-2005-0089525

(51) Int. Cl.
*H04B 1/16* (2006.01)
(52) U.S. Cl. .................... 455/234.1; 455/241.1
(58) Field of Classification Search .......... 455/226.1, 455/234.1, 234.2, 239.1, 240.1, 245.1, 245.2, 455/250.1, 254; 375/343–345
See application file for complete search history.

(56) References Cited

U.S. PATENT DOCUMENTS 6,134,282 A    10/2000    Ben-Efraim et al.
6,278,866 B1 *    8/2001    Elder et al. ............... 455/245.1
6,498,926 B1 *    12/2002    Ciccarelli et al. ........ 455/234.1
2005/0026564 A1 *    2/2005    Haub et al. ............... 455/226.1

FOREIGN PATENT DOCUMENTS

| CN | 1283334 A | 2/2001 |
| GB | 2393052 A | 3/2004 |
| JP | 2000-324008 A | 11/2000 |
| JP | 2002-111767 A | 4/2002 |
| KR | 10-2001-0044957 A | 6/2001 |

\* cited by examiner

*Primary Examiner*—Thanh C Le
(74) *Attorney, Agent, or Firm*—Sughrue Mion, PLLC

(57) ABSTRACT

A radio frequency (RF) signal receiver for controlling a bias current and a method for controlling a bias current are provided. The RF signal receiver includes an antenna which receives an RF signal and an RF signal processing module which processes the received RF signal. The RF signal processing module includes an analog signal processing module which converts the received RF signal into an intermediate frequency (IF) signal and filters the IF signal to allow a frequency band corresponding to a user desired channel to pass and a digital signal processing module which demodulates the filtered signal and decodes the demodulated signal. The amplitude of a bias current required by the analog signal processing module is controlled by the digital signal processing module.

18 Claims, 7 Drawing Sheets

RADIO FREQUENCY SIGNAL RECEIVER FOR CONTROLLING BIAS CURRENT AND METHOD FOR CONTROLLING BIAS CURRENT

CROSS-REFERENCE TO RELATED APPLICATION

This application claims priority from Korean Patent Application No. 10-2005-0089525 filed on Sep. 26, 2005 in the Korean Intellectual Property Office, the disclosure of which is incorporated herein by reference in its entirety.

BACKGROUND OF THE INVENTION

1. Field of the Invention

Apparatuses and methods consistent with the present invention relate to bias current control, and more particularly, to a radio frequency (RF) signal receiver for controlling a bias current and a method for controlling a bias current, in which a bias current of each of a plurality of modules of an analog signal processing module is controlled by counting error bits sensed by a demodulator.

2. Description of the Related Art

With the recent development of semiconductor and communication technologies, mobile products have come into wide use.

The general configuration of such a mobile product is shown in FIGS. 1 and 2.

FIG. 1 is a block diagram of a conventional radio frequency (RF) signal receiver.

Referring to FIG. 1, the RF, signal receiver includes an antenna 110, an analog signal processing module 130, and a digital signal processing module 150. The analog signal processing module 130 includes a bandpass filter 131, a low-noise amplifier 133, a mixer 135, an intermediate frequency (IF) amplifier, and a channel filter 139. The digital signal processing module 150 includes an analog/digital (A/D) converter 151, a demodulator 153, and a decoder 155.

An RF signal received through the antenna 110 is input to the bandpass filter 131. The bandpass filter 131 filters the RF signal to obtain a frequency band including at least one channel. The low-noise amplifier 133 amplifies a signal in a specific frequency band, for example, a broadcasting frequency band of 54-860 MHz, and suppresses noise. The gain of the low-noise amplifier 133 can be adjusted automatically.

The mixer 135 converts a signal output from the low-noise amplifier 133 to an IF signal and the IF amplifier 137 amplifies the IF signal. The channel filter 139 passes only a desired channel in the IF signal amplified by the IF amplifier 137 according to an analog signal processing method. A surface acoustic wave (SAW) filter may be used as the channel filter 139.

A channel signal selected by the channel filter 139 is input to the A/D converter 151 of the digital signal processing module 150, converted into a digital signal, and then demodulated into the original signal by the demodulator 153. The demodulator 153 checks if the demodulated signal is the same as the original signal and corrects an error to restore the original signal.

The decoder 155 decodes the signal demodulated by the demodulator 153 into an audio signal, a video signal, and a data signal and outputs them through a display screen or a speaker (not shown).

FIG. 2 is a block diagram of another conventional RF signal receiver.

Referring to FIG. 2, the RF signal processor includes an antenna 210, an analog signal processing module 230, and a digital signal processing module 250. The analog signal processing module 230 includes a bandpass filter 231, a low-noise amplifier 233, a mixer 235, an IF amplifier 237, a channel digital filter 239, and a digital-to-analog (D/A) converter 241. The digital signal processing module 250 includes an A/D converter 251, a demodulator 253, and a decoder 255.

An RF signal received through the antenna 210 is input to the bandpass filter 231. The bandpass filter 231 filters the RF signal to obtain a frequency band including at least one channel.

The low-noise amplifier 233 amplifies a signal in a specific frequency band, for example, a broadcasting frequency band of 54-860 MHz, and suppresses noise. The gain of the low-noise amplifier 233 may be adjusted automatically.

The mixer 235 converts a signal output from the low-noise amplifier 233 into an IF signal and the IF amplifier 237 amplifies the IF signal. The channel digital filter 239 passes only a desired channel in the IF signal amplified by the IF amplifier 237 according to a digital signal processing method, unlike the channel filter 139 of FIG. 1. To this end, the channel digital filter 239 may include an A/D converter for converting an analog signal amplified by the IF amplifier 237 into a digital signal.

A channel signal selected by the channel filter 239 is input to the D/A converter 241 and converted into an analog signal.

The analog signal is input to the A/D converter 251 of the digital signal processing module 250, converted into a digital signal, and then demodulated into the original signal by the demodulator 253. The demodulator 253 checks if the demodulated signal is the same as the original signal and corrects an error to restore the original signal.

The decoder 255 decodes the signal demodulated by the demodulator 253 into an audio signal, a video signal, and a data signal and outputs them through a display screen or a speaker (not shown).

Since a mobile product such as an RF signal receiver has 'mobility', its practicability is determined by not only the quality of a received signal but also compactness and a low-power feature, unlike in a wired environment.

Each of the RF signal receivers shown in FIGS. 1 and 2 has at least two chips, i.e., the analog signal processing module 130 (230) and the digital signal processing module 150 (250), resulting in a limitation in miniaturization. In particular, when an SAW filter is used as the channel filter 139 in FIG. 1, it has a larger volume than other RF components and thus hinders miniaturization, although the SAW, filter provides high performance. Moreover, in FIG. 2, the channel digital filter 239 may contribute to miniaturization by implementing an SAW filter through digital signal processing, but the D/A converter 241 should be added, resulting in a limitation in miniaturization.

The same bias current is supplied to various RF components included in the analog signal processing module 130 (230) regardless of the quality of a received signal, thus preventing efficient power control.

Therefore, it is necessary to efficiently manage power by miniaturizing an RF signal processor and controlling a bias current according to a receiving environment.

SUMMARY OF THE INVENTION

The present invention provides an RF signal receiver for controlling a bias current and a method for controlling a bias current, in which power consumed by the RF signal receiver is efficiently managed by controlling a bias current according to a receiving environment.

The present invention also provides an RF signal receiver for controlling a bias current and a method for controlling a bias current, in which the RF signal receiver is miniaturized by implementing an analog signal processing circuit and a digital signal processing circuit as a single chip.

According to an aspect of the present invention, there is provided an RF signal receiver including an antenna and an RF signal processing module. The antenna receives, an RF signal and the RF signal processing module processes the received RF signal. The RF signal processing module comprises an analog signal processing module, which converts the received RF signal into an IF signal and filters the IF signal to obtain a frequency band corresponding to a user desired channel to pass, and a digital signal processing module which demodulates the filtered signal and decodes the demodulated signal. The amplitude of a bias current required by the analog signal processing module is controlled by the digital signal processing module.

According to another aspect of the present invention, there is provided a method for controlling a bias current, the method including receiving an RF signal converting the received RF signal into an IF signal and filtering the IF signal to allow a frequency band corresponding to a user desired channel to pass, demodulating the filtered signal, counting error bits of the demodulated signal, and controlling a bias current required for the conversion and the filtering according to the count value of the error bits.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
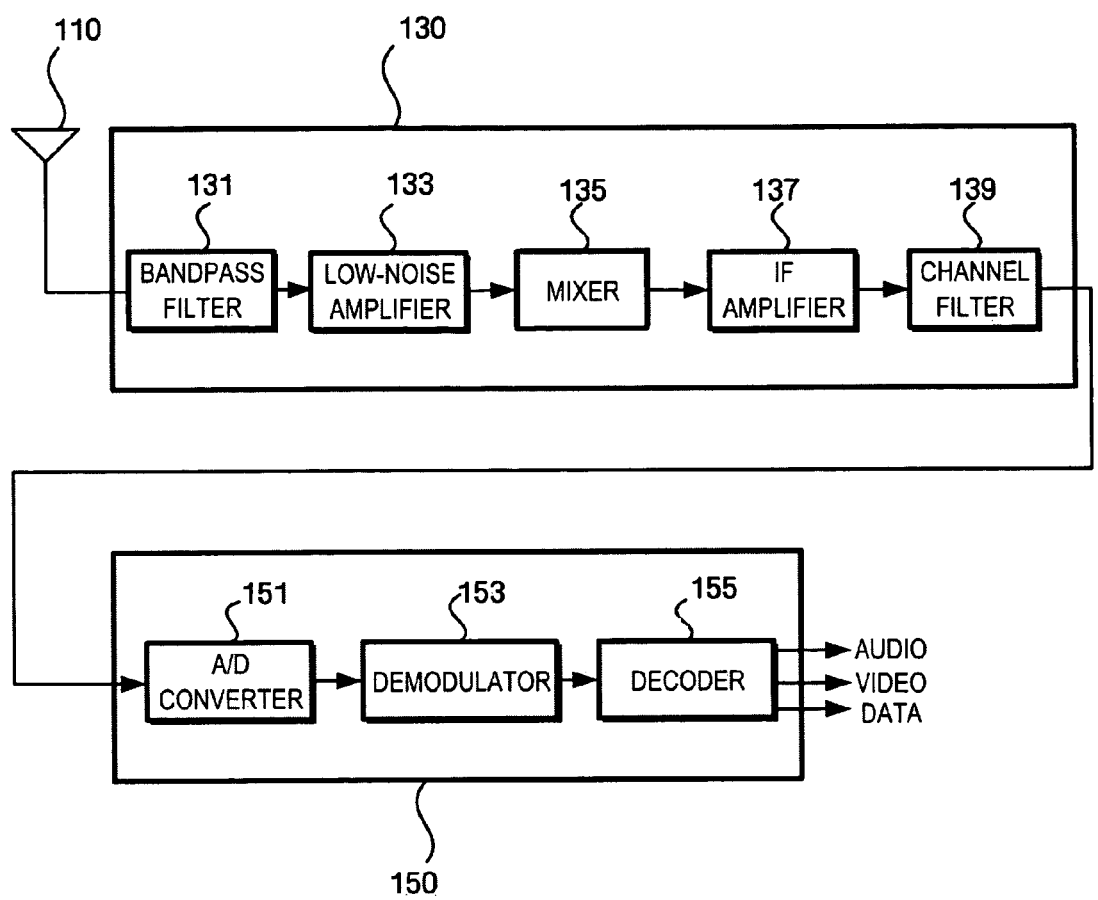
FIG. 1 is a block diagram of a conventional RF signal receiver.
Figure 2:
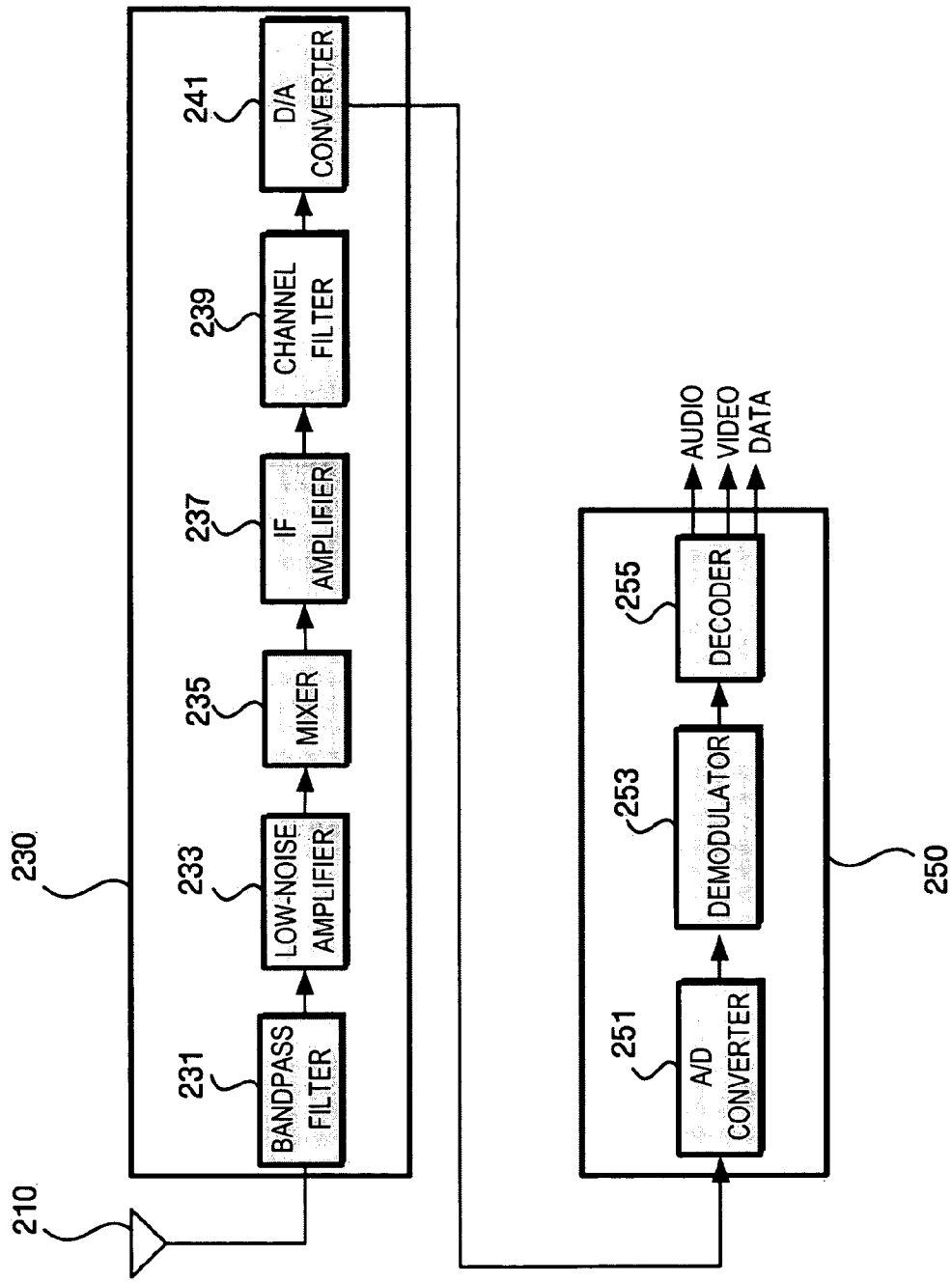
FIG. 2 is a block diagram of another conventional RF signal receiver.

Aspects of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

An RF signal receiver for controlling a bias current and a method for controlling a bias current according to the present invention will now be described hereinafter with reference to flowchart illustrations of methods according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Hereinafter, an RF signal receiver for controlling a bias current and a method for controlling a bias current according to the present invention will be described in detail with reference to the accompanying drawings.

Figure 3:
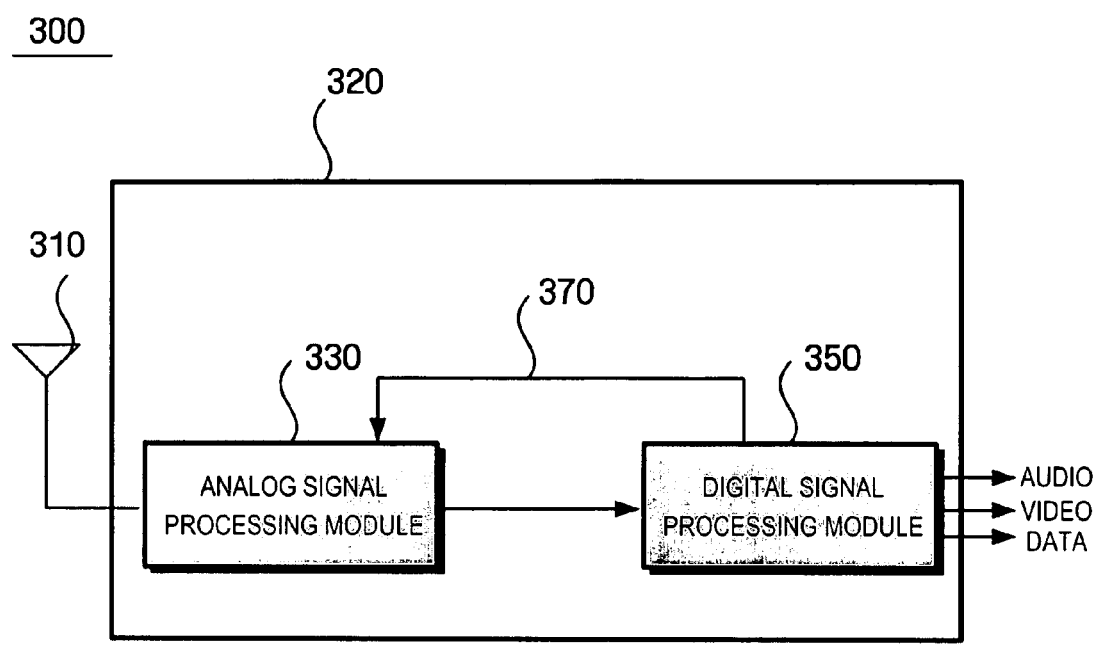
FIG. 3 is a schematic block diagram of an RF signal receiver according to an exemplary embodiment of the present invention.

FIG. 3 is a schematic block diagram of an RF signal receiver 300 according to the present invention.

Referring to FIG. 3, the RF signal receiver 300 includes an antenna 310 that receives an RF signal and an RF signal processing module 320 that processes the received RF signal and provides an audio signal, a video signal, and a data signal.

The RF signal processing module 320 may be implemented as a single chip and includes an analog signal processing module 330 and a digital signal processing module 350.

The term "module", as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute in one or more computers in a communication system.

The analog signal processing module 330 converts an RF signal received through the antenna 310 into an IF signal and filters the IF signal to allow only a frequency band corresponding to a user desired channel to pass. The analog signal processing module 330 transmits the frequency band to the digital signal processing module 350.

The digital signal processing module 350 demodulates the IF signal received from the analog signal processing module 330 and decodes the demodulated IF signal into an audio signal, a video signal, and a data signal.

The digital signal processing module 350 counts error bits in the demodulated signal and generates a bias current control signal 370 corresponding to the count value of the error bits. The digital signal processing module 350 transmits the bias, control signal 370 to the analog signal processing module 330, thereby controlling the amplitude of a bias current of modules of the analog signal processing module 330. In one exemplary embodiment, a separate feedback path is formed for the transmission of the bias control signal 370 to the analog signal processing module 330 in a transmission channel. Alternatively, the bias control signal 370 may be fed back to the analog signal processing module 330 along the same transmission channel used to transmit the frequency band from the analog signal processing module 330 to the digital signal processing module 350. The bias current control signal 370 may be a current signal or a voltage signal.

The analog signal processing module 330 and the digital signal processing module 350 of FIG. 3 may be implemented in forms as will be described with reference to FIGS. 4 through 6.

Figure 4:
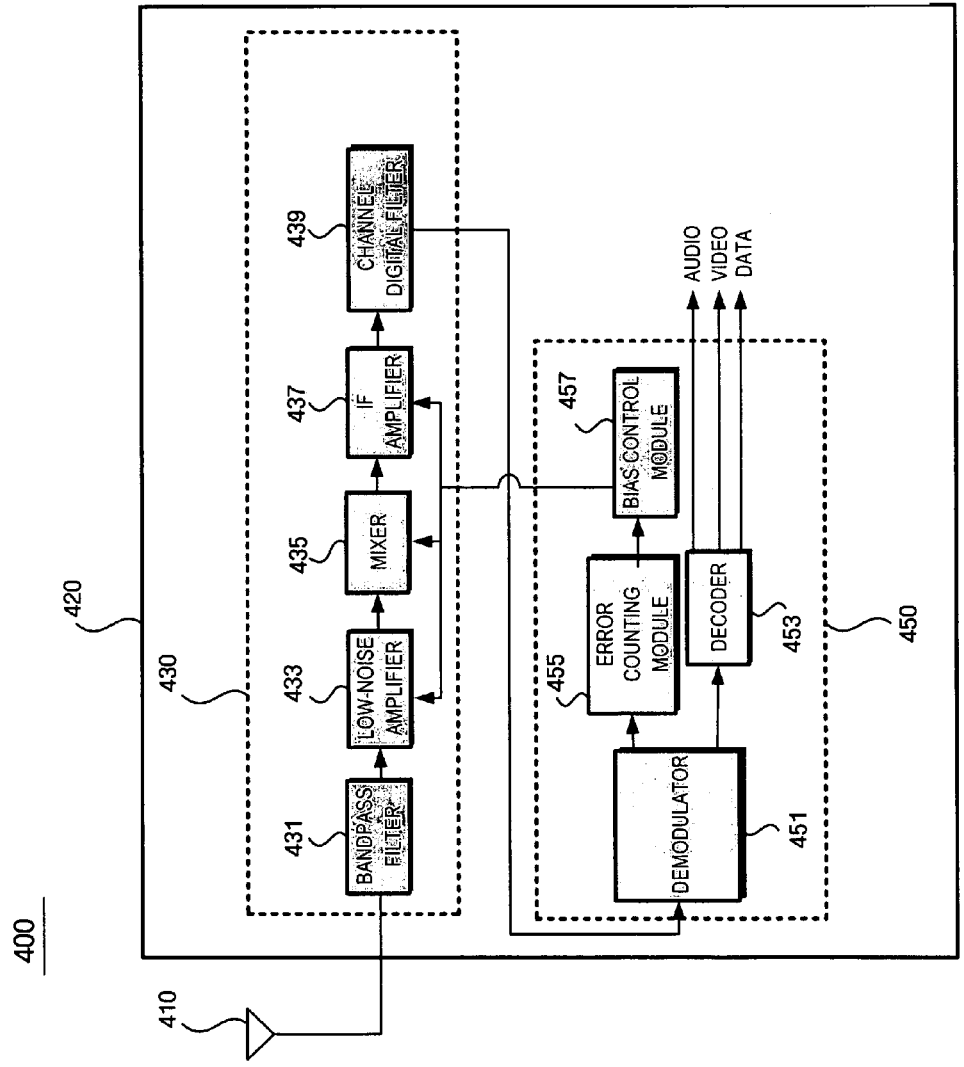
FIG. 4 is a detailed block diagram of an RF signal receiver according to an exemplary embodiment of the present invention.

FIG. 4 is a detailed block diagram of an RF signal receiver 400 according to an exemplary embodiment of the present invention.

Referring to FIG. 4, the RF signal receiver 400 includes an antenna 410 that receives an RF signal and an RF signal processing module 420 that processes the received RF signal and provides an audio signal, a video signal, and a data signal.

The RF signal processing module 420 may be implemented as a single chip and includes an analog signal processing module 430 and a digital signal processing module 450. The analog signal processing module 430 includes a bandpass filter 431, a low-noise amplifier 433, a mixer 435, an IF amplifier 437, and a channel digital filter 439. The digital signal processing module 450 includes a demodulator 451, a decoder 453, an error counting module 455, and a bias control module 457.

The RF signal received through the antenna 410 is input to the bandpass filter 431. The bandpass filter 431 filters the RF signal to obtain a frequency band including at least one channel to pass.

The low-noise amplifier 433 amplifies a signal in a specific frequency band, for example, a broadcasting frequency band of 54-860 MHz, and suppresses noise. The gain of the low-noise amplifier 433 may be adjusted automatically.

The mixer 435 converts a signal output from the low-noise amplifier 433 into an IF signal and the IF amplifier 437 amplifies the IF signal.

A local oscillation frequency used in the mixer 435 may be adjusted according to a frequency bandpass filtered by the channel digital filter 439.

The channel digital filter 439 filters a signal of a desired channel from the signal amplified by the IF amplifier 437 according to a digital signal processing method.

To this end, the channel digital filter 439 may include an A/D converter for converting an analog signal amplified by the IF amplifier 437 into a digital signal.

A channel signal selected by the channel digital filter 439 is demodulated into the original signal by the demodulator 451 of the digital signal processing module 450.

The decoder 453 decodes the signal demodulated by the demodulator 451 into an audio signal, a video signal, and a data signal and outputs them through a display screen or a speaker (not shown).

The demodulator 451 checks if the demodulated signal is the same as the original signal and corrects an error, thereby restoring the original signal. The error counting module 455 counts error bits.

The bias control module 457 controls a bias current flowing through the low-noise amplifier 433, the mixer 435, or the IF amplifier 437 within the analog signal processing module 430 based on the count value of the error bits. The bias control module 457 controls bias current(s) through a feedback path from the bias control module 457 to the analog signal processing module 430. Specifically, the bias control module 457 is connected to at least one of the low-noise amplifier 433, the mixer 435, and the IF amplifier 437 through a transmission channel.

For example, a small count value counted by the error counting module 455 may indicate that an RF signal receiving environment is good. When the receiving environment is good, the bias control module 457 reduces the amplitude of a bias current flowing through the low-noise amplifier 433, the mixer 435, or the IF amplifier 437.

Conversely, a large count value counted by the error counting module 455 may indicate that the RF signal receiving environment is poor. When the receiving environment is poor, the bias control module 457 increases the amplitude of the bias current flowing through the low-noise amplifier 433, the mixer 435, or the IF amplifier 437. As such, since the error counting module 455 counts error bits and the count value is used to control the amplitude of the bias current, power consumed by the RF signal receiver 400 can be efficiently managed.

Although the amplitude of the bias current flowing through the low-noise amplifier 433, the mixer 435, or the IF amplifier 437 is controlled in FIG. 4, a bias current flowing through any RF module that is included in the analog signal processing module 430 and requires the bias current may be controlled.

Figure 5:
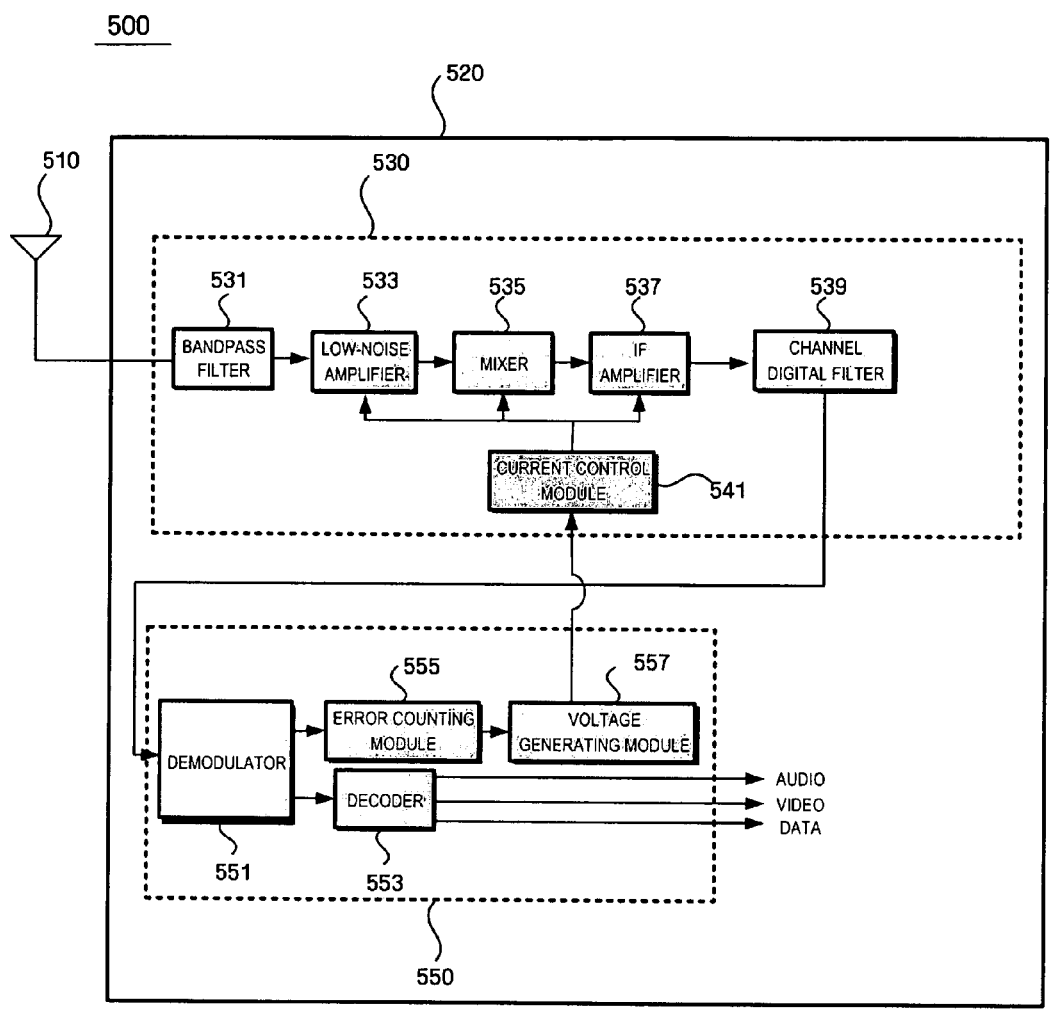
FIG. 5 is a detailed block diagram of an RF signal receiver according to another exemplary embodiment of the present invention.

FIG. 5 is a detailed block diagram of an RF signal receiver 500 according to another exemplary embodiment of the present invention.

The RF signal receiver 500 includes an antenna 510 that receives an RF signal and an RF signal processing module 520 that processes the received RF signal and provides an audio signal, a video signal, and a data signal.

The RF signal processing module 520 may be implemented as a single chip and includes an analog signal processing module 530 and a digital signal processing module 550. The analog signal processing module 530 includes a bandpass filter 531, a low-noise amplifier 533, a mixer 535, an IF amplifier 537, a channel digital filter 539, and a current control module 541. The digital signal processing module 550 includes a demodulator 551, a decoder 553, an error counting module 555, and a voltage generating module 557.

The RF signal received through the antenna 510 is input to the bandpass filter 531. The bandpass filter 531 filters the RF signal to allow only a frequency band including at least one channel to pass.

The low-noise amplifier 533 amplifies a signal in a specific frequency band, for example, a broadcasting frequency band of 54-860 MHz, and suppresses noise. The gain of the low-noise amplifier 533 may be adjusted automatically.

The mixer 535 converts a signal output from the low-noise amplifier 533 to an IF signal and the IF amplifier 537 amplifies the IF signal.

A local oscillation frequency used in the mixer 535 can be adjusted according to a frequency band filtered by the channel digital filter 539.

The channel digital filter 539 filters the signal amplified by the IF amplifier 537 using a digital signal processing method, to allow a signal in a desired channel to pass. To this end, the channel digital filter 539 may include an A/D converter for converting an analog signal amplified by the IF amplifier 537 to a digital signal. The current control module 541 controls a bias current flowing through the low-noise amplifier 533, the mixer 535, or the IF amplifier 537.

A channel signal selected by the channel digital filter 539 is demodulated into the original signal by the demodulator 551 of the digital signal processing module 550.

The decoder 553 decodes the signal demodulated by the demodulator 551 into an audio signal, a video signal, and a data signal and outputs them through a display screen or a speaker (not shown).

The demodulator 551 checks if the demodulated signal is the same as the original signal and corrects an error to restore the original signal. The error counting module 555 counts error bits.

The voltage generating module 557 generates a predetermined voltage corresponding to the count value of the error bits and outputs the generated voltage to the current control module 541 of the analog signal processing module 530 through a feedback transmission channel.

The current control module 541 controls the amplitude of a bias current flowing through the low-noise amplifier 533, the mixer 535, or the IF amplifier 537 according to the amplitude of the voltage provided by the voltage generating module 557.

For example, when the count value of the error counting module 555 is small, the voltage generating module 557 generates a voltage having low amplitude and outputs the voltage to the current control module 541. The current control module 541 may also reduce the amplitude of the bias current flowing through the low-noise amplifier 533, the mixer 535, or the IF amplifier 537 if the amplitude of the input voltage is low.

When the count value of the error counting module 555 is large, the voltage generating module 557 generates a voltage having high amplitude and outputs the voltage to the current control module 541. The current control module 541 may also increase the amplitude of the bias current flowing through the low-noise amplifier 533, the mixer 535, or the IF amplifier 537 if the amplitude of the input voltage is high.

Although the amplitude of the bias current flowing through the low-noise amplifier 533, the mixer 535, or the IF amplifier 537 is controlled in FIG. 5, a bias current flowing through any RF module that is included in the analog signal processing module 530 and requires the bias current may be controlled.

Figure 6:
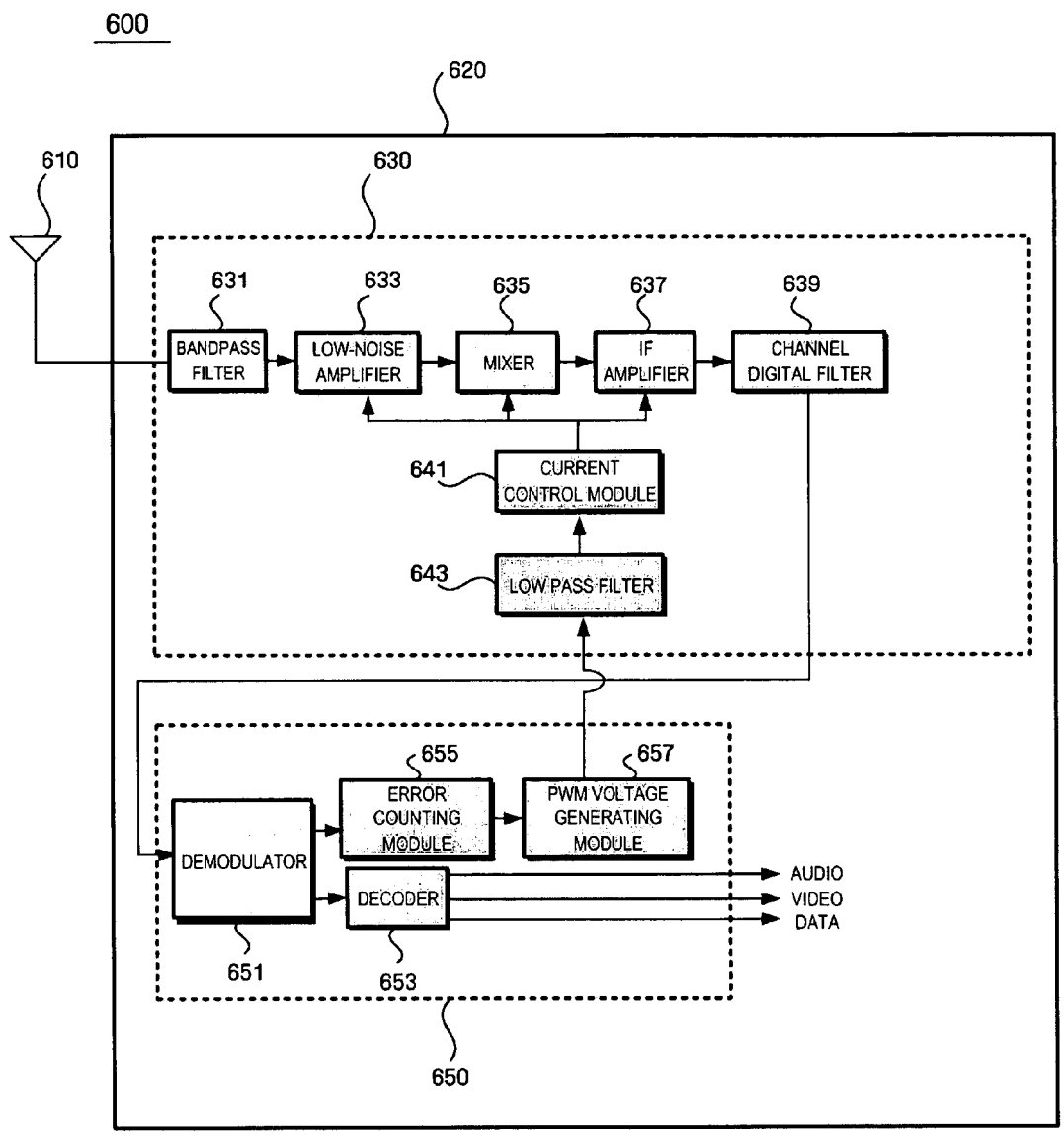
FIG. 6 is a detailed block diagram of an RF signal receiver according to still another exemplary embodiment of the present invention.

FIG. 6 is a detailed block diagram of an RF signal receiver 600 according to still another exemplary embodiment of the present invention.

Referring to FIG. 6, the RF signal receiver 600 includes an antenna 610 that receives an RF signal and an RF signal processing module 620 that processes the received RF signal and provides an audio signal, a video signal, and a data signal.

The RF signal processing module 620 may be implemented as a single chip and includes an analog signal processing module 630 and a digital signal processing module 650. The analog signal processing module 630 includes a bandpass filter 631, a low-noise amplifier 633, a mixer 635, an IF amplifier 637, a channel digital filter 639, a current control module 641, and a low pass filter 643. The digital signal processing module 650 includes a demodulator 651, a decoder 653, an error counting module 655, and a pulse width modulation (PWM) voltage generating module 657.

The RF signal received through the antenna 610 is input to the bandpass filter 631. The bandpass filter 631 filters the RF signal to allow only a frequency band including at least one channel to pass.

The low-noise amplifier 633 amplifies a signal in a specific frequency band, for example, a broadcasting frequency band of 54-860 MHz, and suppresses noise. The gain of the low-noise amplifier 633 may be adjusted automatically.

The mixer 635 converts a signal output from the low-noise amplifier 633 to an IF signal and the IF amplifier 637 amplifies the IF signal.

A local oscillation frequency used in the mixer 635 can be adjusted according to a frequency band filtered by the channel digital filter 639.

The channel digital filter 639 filters the signal amplified by the IF amplifier 637 using a digital signal processing method, to allow a signal in a desired channel to pass. To this end, the channel digital filter 639 may include an A/D converter for converting an analog signal amplified by the IF amplifier 637 to a digital signal.

The current control module 641 controls a bias current flowing through the low-noise amplifier 633, the mixer 635, or the IF amplifier 637 and a detailed operation thereof will be described later.

A channel signal selected by the channel digital filter 639 is demodulated into the original signal by the demodulator 651 of the digital signal processing module 650.

The decoder 653 decodes the signal demodulated by the demodulator 651 into an audio signal, a video signal, and a data signal and outputs them through a display screen or a speaker (not shown).

The demodulator 651 checks if the demodulated signal is the same as the original signal and corrects an error to restore the original signal. The error counting module 655 counts error bits.

The PWM voltage generating module 657 generates a predetermined PWM voltage corresponding to the count value of the error bits.

For example, when the count value of the error counting module 655 is small, the PWM voltage generating module 657 may reduce the duty ratio of the PWM voltage signal. When the count value of the error counting module 655 is large, the PWM voltage generating module 657 may increase the duty ratio of the PWM voltage signal. The PWM voltage generating module 657 communicates with the low pass filter 643 via a transmission channel to feedback information to the analog signal processing module 630.

The low pass filter 643 of the analog signal processing module 630 performs low pass filtering on the PWM voltage signal generated by the PWM voltage generating module 657 and outputs a direct current (DC) voltage corresponding to the duty ratio of the PWM voltage. The current control module 641 controls the amplitude of the bias current flowing through the low-noise amplifier 633, the mixer 635, or the IF amplifier 637 according to the amplitude of the output DC voltage.

Although the amplitude of the bias current flowing through the low-noise amplifier 633, the mixer 635, or the IF amplifier 637 is controlled in FIG. 6, a bias current flowing through any RF module that is included in the analog signal processing module 630 and requires the bias current may be controlled.

Figure 7:
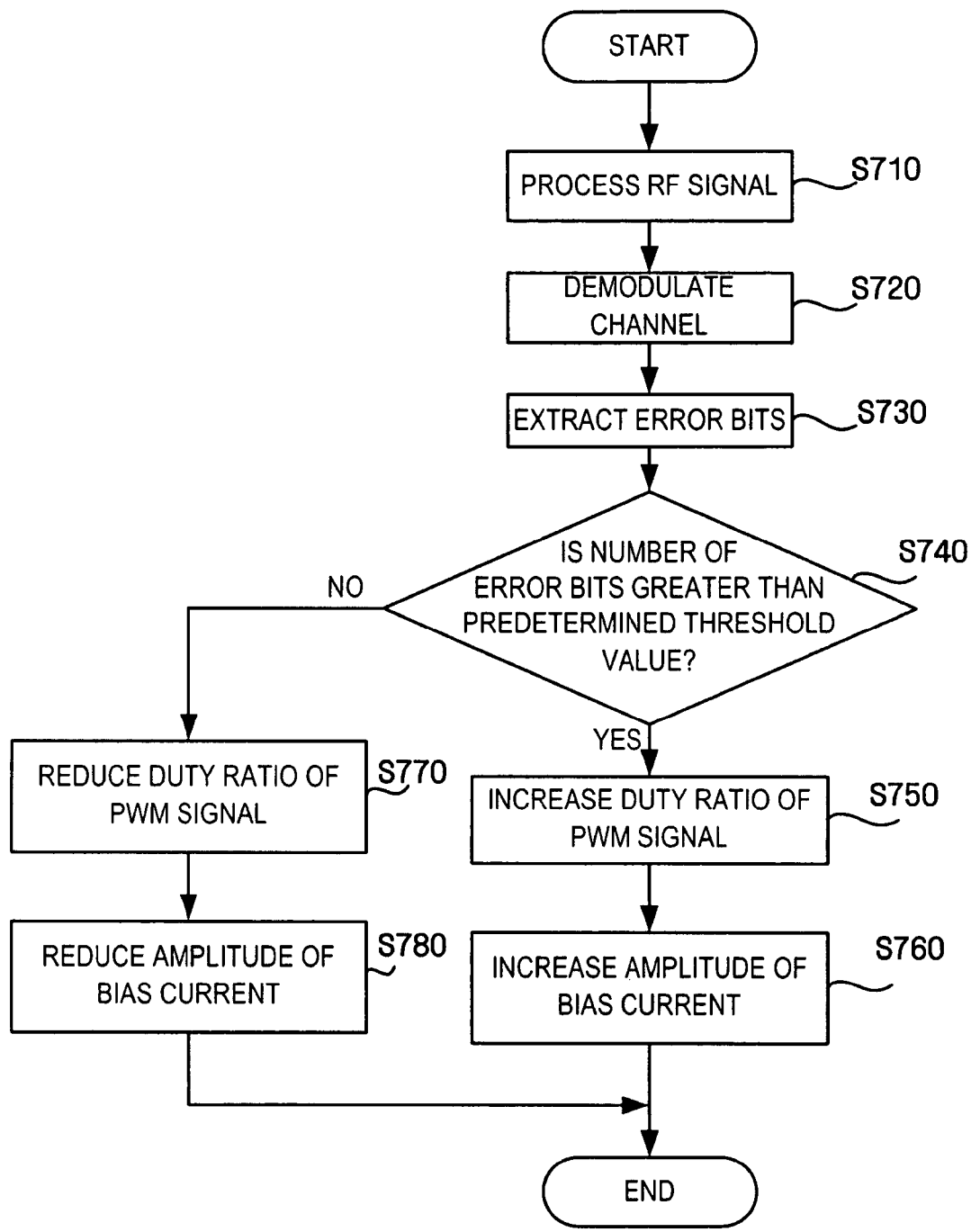
FIG. 7 is a flowchart illustrating a method for controlling a bias current according to an exemplary embodiment of the present invention.

FIG. 7 is a flowchart illustrating a method for controlling a bias current according to an exemplary embodiment of the present invention.

First, an RF signal is converted to an IF signal in operation S710. The IF signal is filtered to allow only a desired channel to pass and then the desired channel is demodulated in operation S720.

Error bits are extracted from the demodulated signal in operation S730 to determine whether the number of error bits is greater than a predetermined threshold value in operation S740.

If the number of error bits is greater than the threshold value, it indicates that an RF signal receiving environment is poor and thus the duty ratio of a PWM signal is increased in operation S750. The amplitude of a bias current flowing through an analog signal processing circuit is increased using the PWM signal in operation S760.

If the number of error bits is less than the threshold value, it indicates that the RF signal receiving environment is good and thus the duty ratio of the PWM signal is reduced in operation S770. The amplitude of the bias current flowing through the analog signal processing circuit is reduced using the PWM signal in operation S780.

According to an aspect of the present invention, a bias current of the maximum amplitude is supplied in a poor receiving environment, thereby allowing optimal performance. In a good receiving environment, the amplitude of the bias current is reduced to the extent that a user cannot sense such a reduction, thereby achieving low power consumption of an RF signal receiver.

Furthermore, an analog signal processing circuit and a digital signal processing circuit are implemented as a single chip, thus contributing to miniaturization of the RF signal receiver.

Although the present invention has been described in connection with the exemplary embodiments of the present invention, it will be apparent to those skilled in the art that various modifications and changes may be made thereto without departing from the scope and spirit of the invention. Therefore, it should be understood that the above exemplary embodiments are not limitative, but illustrative in all aspects.

What is claimed is:

1. A radio frequency (RF) signal receiver comprising:
   an antenna which receives an RF signal; and
   an RF signal processing module which processes the received RF signal, the RF signal processing module comprising:
      an analog signal processing module which converts the received RF signal into an intermediate frequency (IF) signal and filters the IF signal to obtain a frequency band corresponding to a desired channel to pass, and
      a digital signal processing module which demodulates the filtered IF signal to generate a demodulated signal and decodes the demodulated signal,
   wherein an amplitude of a bias current of the analog signal processing module is controlled by the digital signal processing module, and
   wherein the digital signal processing module generates a PWM voltage signal having a duty ratio corresponding to an error in the demodulated signal, and the amplitude of the bias current of the analog signal processing module is based on the PWM voltage signal.

2. The RF signal receiver of claim 1, wherein the digital signal processing module comprises:
   an error counting module which counts error bits of the demodulated signal to generate a count value; and
   a bias control module which controls the amplitude of the bias current of the analog signal processing module based on the count value of the error counting module.

3. The RF signal receiver of claim 2, wherein the RF signal processing module is implemented as a single chip.

4. The RF signal receiver of claim 1, wherein the digital signal processing module comprises an error counting module which counts error bits of the demodulated signal to generate a count value and a voltage generating module which generates a voltage corresponding to the count value of the error counting module, and the analog signal processing module comprises a current control module which controls the amplitude of the bias current of the analog signal processing module according to an amplitude of the voltage.

5. The RF signal receiver of claim 4, wherein the RF signal processing module is implemented as a single chip.

6. The RF signal receiver of claim 1, wherein the digital signal processing module comprises an error counting module which counts error bits of the demodulated signal to generate a count value and a pulse width modulation (PWM) voltage generating module which generates the PWM voltage signal having the duty ratio corresponding to the count value of the error counting module, and the analog signal processing module comprises a low pass filter which performs low pass filtering on the PWM voltage signal and outputs a direct current (DC) voltage and a current control module which controls the amplitude of the bias current of the analog signal processing module according to an amplitude of the DC voltage.

7. The RF signal receiver of claim 6, wherein the RF signal processing module is implemented as a single chip.

8. The RF signal receiver of claim 1, wherein the RF signal processing module is implemented as a single chip.

9. The RF signal receiver of claim 1, wherein the digital signal processing module controls the amplitude of the bias current based on the demodulated signal.

10. The RF signal receiver of claim 1, wherein the digital signal processing module comprises an error counting module which counts error bits of the demodulated signal to generate a count value.

11. A method for controlling a bias current, the method comprising:
   receiving a radio frequency (RF) signal;
   converting the received RF signal into an intermediate frequency (IF) signal and filtering the IF signal to pass a frequency band corresponding to a desired channel;
   demodulating the filtered IF signal to generate a demodulated signal;
   counting error bits of the demodulated signal to generate a count value; and
   controlling a bias current for the converting and the filtering according to the count value of the error bits,
   wherein the controlling of the bias current comprises:

generating a pulse width modulation (PWM) voltage signal having a duty ratio corresponding to the count value of the error bits; and controlling an amplitude of the bias current of the analog signal processing module based on the PWM voltage signal.

12. The method of claim 11, wherein the controlling of the bias current comprises:

generating a voltage corresponding to the count value of the error bits; and controlling the bias current for the converting and the filtering according to an amplitude of the voltage.

13. The method of claim 11, wherein the controlling of the bias current further comprises performing low pass filtering on the PWM voltage signal and providing a direct current (DC) voltage, wherein the controlling the amplitude comprises controlling the amplitude of the bias current of the analog signal processing module according to an amplitude of the DC voltage.

14. A radio frequency (RF) signal receiver comprising:

an antenna which receives an RF signal; and an RF signal processor comprising:

an analog signal processing component which converts the received RF signal into an intermediate frequency (IF) signal and filters the IF signal to pass a frequency band, a digital signal processing component which demodulates the passed frequency band to generate a demodulated signal and decodes the demodulated signal, and a transmission channel disposed between the analog signal processing component and the digital signal processing component, wherein an amplitude of a bias current of the analog signal processing component is controlled by the digital signal processing component, and wherein the digital signal processing component generates a PWM voltage signal having a duty ratio corresponding to an error in the demodulated signal, and the amplitude of the bias current of the analog signal processing component is based on the PWM voltage signal.

15. The RF signal receiver of claim 14, wherein the transmission channel is a feedback transmission channel.

16. The RF signal receiver of claim 14, wherein the RF signal processor is implemented as a single chip.

17. The RF signal receiver of claim 14, wherein the digital signal processing module controls the amplitude of the bias current based on the demodulated signal.

18. The RF signal receiver of claim 14, wherein the digital signal processing component comprises an error counting module which counts error bits of the demodulated signal to generate a count value.

\* \* \* \* \*